(12) United States Patent
Jones, Jr.

(10) Patent No.: US 8,550,512 B2
(45) Date of Patent: Oct. 8, 2013

(54) POOPER SCOOPER

(76) Inventor: Odell Jones, Jr., Baltimore, MD (US)

( * ) Notice: Subject to any disclaimer, the term of this patent is extended or adjusted under 35 U.S.C. 154(b) by 220 days.

(21) Appl. No.: 12/584,560

(22) Filed: Sep. 8, 2009

(65) Prior Publication Data

US 2011/0057464 A1 Mar. 10, 2011

(51) Int. Cl.
*A01K 29/00* (2006.01)
(52) U.S. Cl.
USPC .......................................................... 294/1.5
(58) Field of Classification Search
USPC .................... 294/1.3, 1.4, 1.5, 19.1
See application file for complete search history.

(56) References Cited

U.S. PATENT DOCUMENTS

| | | | | |
|---|---|---|---|---|
| 5,795,004 A | * | 8/1998 | Zimmerman | 294/119 |
| 6,478,351 B1 | * | 11/2002 | Nelson | 294/1.4 |
| 7,631,910 B2 | * | 12/2009 | Shalhoub | 294/1.5 |
| 7,686,361 B1 | * | 3/2010 | Flinn | 294/1.4 |
| 2008/0012366 A1 | * | 1/2008 | Tsukamoto | 294/1.5 |
| 2009/0096227 A1 | * | 4/2009 | Pender et al. | 294/1.5 |

* cited by examiner

*Primary Examiner* — Stephen Vu
(74) *Attorney, Agent, or Firm* — Jerry Joseph; Law Office of Jerry Joseph, PLLC

(57) ABSTRACT

The pooper scooper includes an elongated foldable pole having a grip at one end and a pivotable waste collecting assembly at the other end, the elongate pole being divided into upper and lower sections; the upper section including the grip at one end and a releasable locking mechanism at the other end; a joint or hinge mechanism interconnecting the two sections; the lower section including a selectively actuated waste collecting control; and the pivotable waste collecting assembly adapted to hold a bag open to catch pet wastes or other materials and automatically close the bag when ready for to disposal through actuation of the waste collecting control. The pooper scooper is also part of a pet waste disposal system including a bag dispenser and a bag adapted to be mounted to the waste trapping assembly.

3 Claims, 24 Drawing Sheets

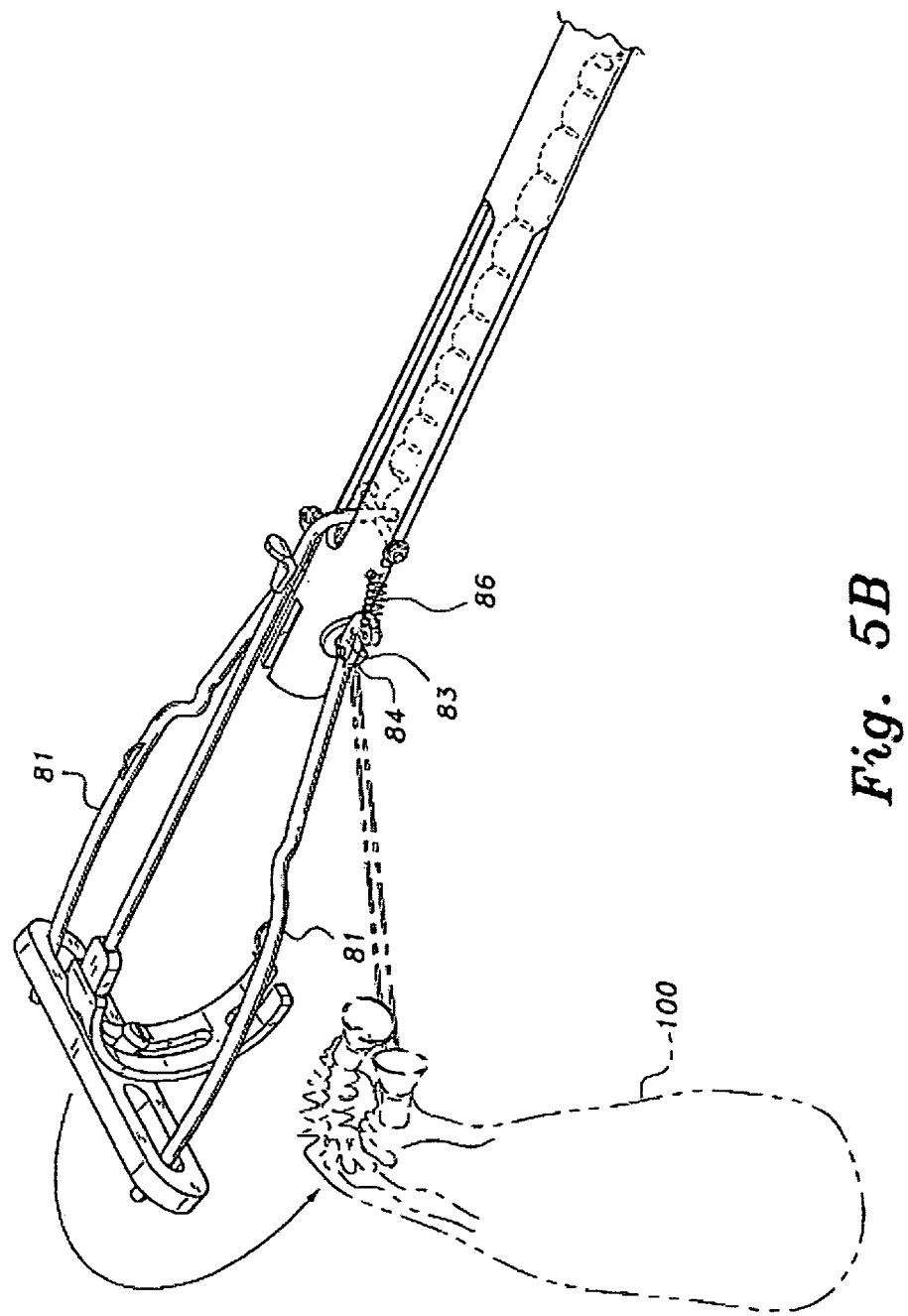

POOPER SCOOPER

CROSS-REFERENCE TO RELATED APPLICATIONS

This application claims the benefit of U.S. Provisional Patent Application No. 61/440,894, filed on Feb. 9, 2011, the disclosure of which is incorporated herein in its entirety by reference.

BACKGROUND OF THE INVENTION

1. Field of the Invention

The present invention relates to pet hygiene accessories, and more particularly to a pooper scooper having features for convenient, clean disposal of a pet's wastes or other miscellaneous items.

2. Description of the Related Art

In many communities, neighborhoods and public parks, it is required by rules for the pet owner to clean after the pet wherever the pet defecates for aesthetic and/or sanitary reasons. One of the most common ways to clean required the pet owner to carry round a plastic bag that the pet owner would invert and wear as a glove to scoop the waste for prompt disposal.

Another solution includes manual devices specially designed to hold a bag that the pet would defecate in. These devices, while convenient, still require some additional handling that increases chances of unsanitary exposure.

Moreover, some of these devices require setup and operation that may be more of an inconvenience than help. Due to the large number of pet lovers who want to properly care for their pets and observe the rules of their residence and public areas, it is much desired in the art for a convenient easy-to-use and sanitary pet waste disposal device. Thus, a pooper scoopers solving aforementioned problem desired solved.

BRIEF SUMMARY OF THE INVENTION

The pooper scooper includes an elongated foldable pole having a grip at one end and a pivotable waste collecting assembly at the other end, the elongate pole being divided into upper and lower sections; the upper section including the grip at one end and a releasable locking mechanism at the other end; a joint or hinge mechanism interconnecting the two sections; the lower section including a selectively actuated waste collecting control; and the pivotable waste collecting assembly adapted to hold a bag open to catch pet wastes or other materials and automatically close the bag when ready for disposal through actuation of the waste collecting control.

The pooper scooper is also part of a pet waste disposal system including a bag dispenser and a bag adapted to be mounted to the waste trapping assembly. These and other features of the present invention will become readily apparent upon further review of the following specification and drawings.

BRIEF DESCRIPTION OF THE SEVERAL VIEWS OF THE DRAWINGS

FIG. 5B is a perspective view of the pooper scooper according to the present invention showing operation of the prongs to a closed position.

FIG. 15 shows a picture of a rectangle shape box made of clear Plex Glass strips of different widths as shown in FIG. 15. The Plex Glass Strips #1, 2, 3, 5, 6, 8, and 9 are so layered to create slotted area #4 and #7. This slotted area runs from top to bottom of the unit. FIG. 15 item #10 shows the lid of the unit. Item #14 shows the waste bag pull down hook which keeps the waste bags properly loaded in the slotted area of the dispense/loader, preventing any spacing or back-up of the bags in the shut. The pull down hook 14 is placed or hooked over the top bag in the shut. Item 12a in FIG. 15 is resting on #16a and #16b. On the side of 16a and 16b is 16aa and 16bb which are the waste bag balancing arms. These arms prevent the weight of the bags from causing lip 12a to cock in the shut, preventing the prongs of the waste catching unit from making an easy transition into 12aa. When the prong of the waste catching unit is inserted into 12a and pressure is applied in a downward motion, lever #16a and 16b gives way to the pressure applied, shown in #16aa and 16bb allowing the unit to drop out of the bottom of the waste bag dispenser/loader. FIG. 15, item #20 shows the waste catching unit with its prongs inserted into the waste bag dispenser/loader. FIG. 15, item #21 shows a perspective view of the waste catching unit dropping from the bottom of the dispenser/loader with a bag loaded onto the unit. FIG. 15 items 22a and 22b are the left and right prong guide that guides the prongs to their desired location at 16c for the insertion of the prong into waste bags.

FIG. 16 shows the 14b slot for the pull down hook 14. Item 15 creates a downward pull on the pull down hook 14. Item 16c are pre-determined openings for extraction.

FIGS. 15, 16, 17 show 11a and 11b, these are the dog waste bag loading strips. The waste bag loading strips are part of the dog waste bag loading system and means of refill. The loading strips have been sprayed on one side of the strip with adhesive spray, double sided tape or hot wax with just enough adhesiveness to hold the dog waste bags at area 12a and 12aa until the waste bags are loaded into the slotted area. Loading strips 11a and 11b can be pulled away from the bags discarded.

FIGS. 15, 17, and 18 the plastic cylinder #12aa FIG. 18 is glued inside pocket #13a to create a permanent opening in area #13a of waste bag #13. 13a extends the length of the bag and is designed to receive the prong of the dog waste catching unit.

FIG. 19 shows the phantom position of lever 16a and 16b. FIG. 19 also shows the position of #17a and 17b blocking the exit of the waste bags.

FIGS. 15, 19, and 20 show the left and right waste extraction levers 16a and 16b. These levers stop the waste bag at holes 16c. FIG. 16 show the left and right holes cut into the Plexi Glass strips. FIGS. 15, 19, and 20 shows that as #16a and #16b begin their downward motion to extract a waste bag 17a and #17b which is piggy backed on top of 16a and 16b the waste bag extraction levers begins to move in correlation with 16a and 16b. 17a and 17b begins its movement to block the exits of the waste bags, to prevent waste bags to fall through the shut. FIGS. 15, 19, and 20 show the tension spring 18a and 18b. These springs create the tension on the waste bag extraction lever.

FIGS. 21 and 22 are changes made to prongs 81 of the dog waste catching unit described within the provisional application 61/440,894. Area 87 of prongs 81 of the provisional is a spring loaded hook locked behind the dog waste bag in order to extract the bag from its bag rack. The spring loaded bag hook 87 has been changed. Instead of using a hook to extract the bag from its dispenser, the hook has been replaced with a wedge. A thin wedge piece with an inclining slope has been taped into the slotted area. Inserting the prongs 81 of the waste catching unit into 12a and 12aa of waste bag 13 holding the waste bag in place on the prong of the unit when the prongs are released by the spring action of the bag extraction levers 16a and 16b.

Similar reference characters denote corresponding features consistently throughout the attached drawings.

DETAILED DESCRIPTION OF THE INVENTION

The present invention relates to an easy-to-use, sanitary pooper scooper, which permits hands-free, selectively actuated automatic capture and disposal of pet wastes via a bag specific to the pooper scooper. These and other features will be discussed further below.

Figure 1:
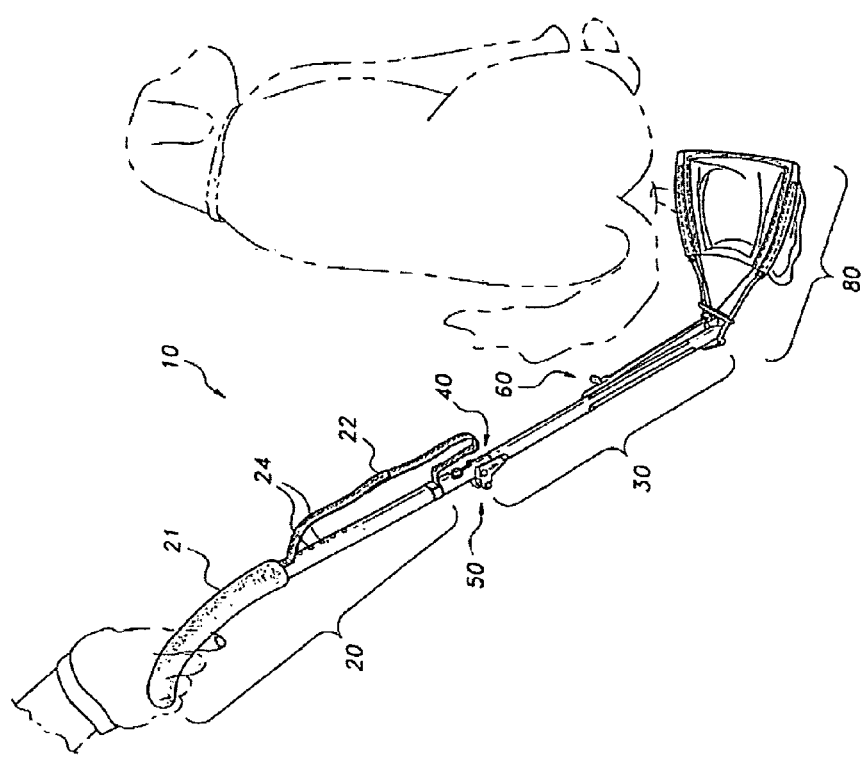
FIG. 1 is an environmental, perspective view of a pooper scooper according to the present invention.
Figure 2:
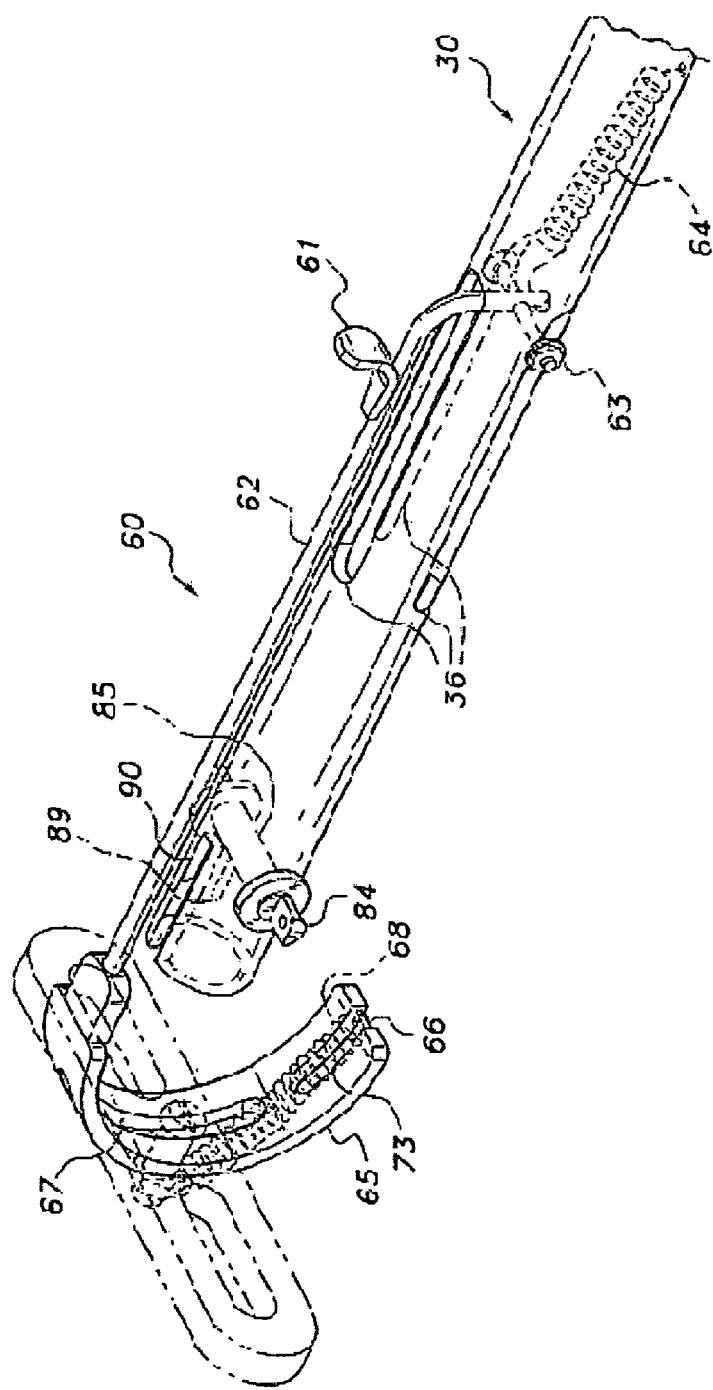
FIG. 2 is a perspective view of the waste collecting control of the pooper scooper according to the present invention.
Figure 3:
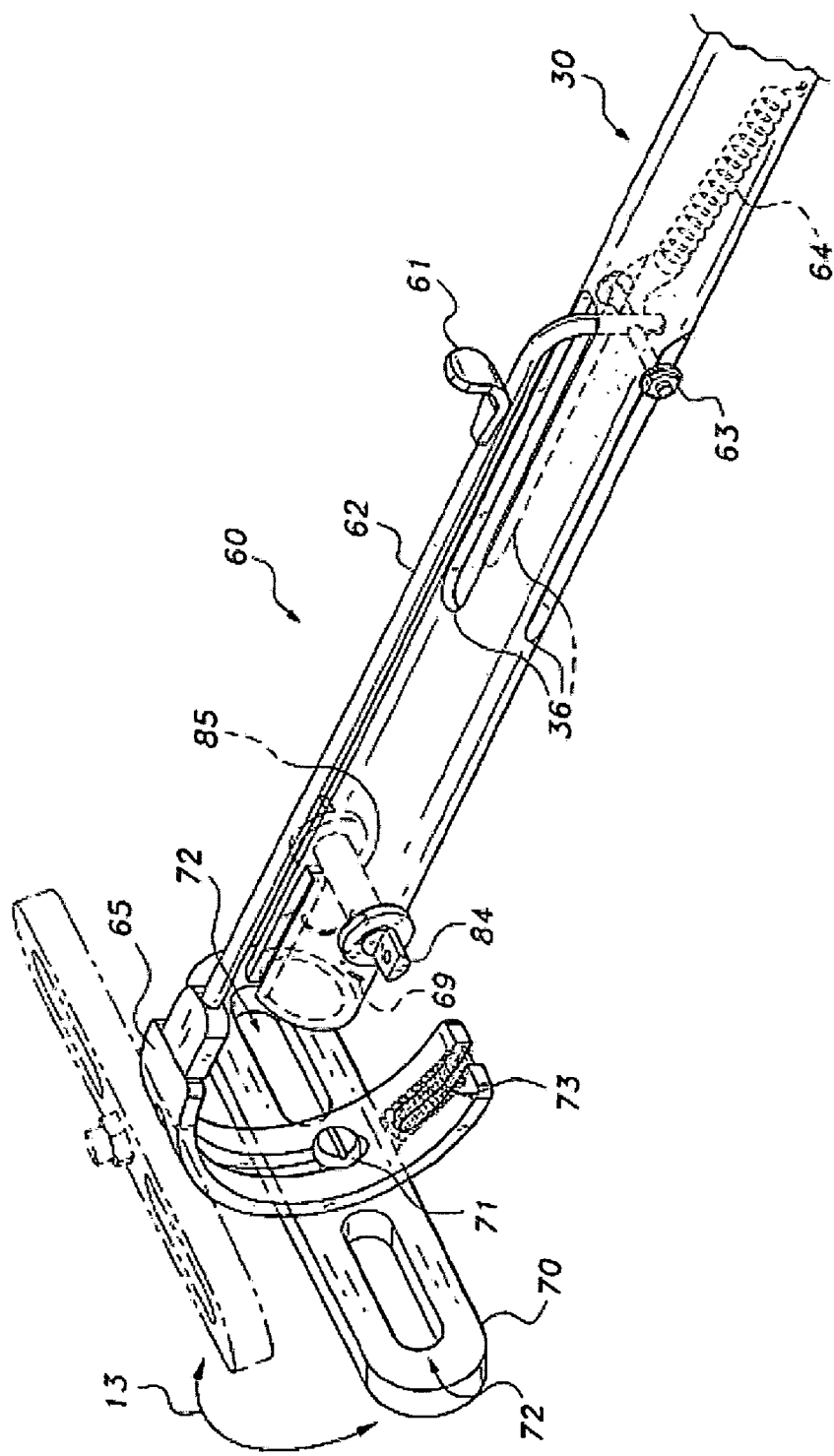
FIG. 3 is an enlarged perspective view of the operation the waste collecting control of the pooper scooper according to the present invention.

Referring to FIGS. 1-3, the pooper scooper 10 includes an elongated foldable pole divided into two sections, an upper section 20 and a lower section 30. The upper section 20 may be a substantially hollow cylindrical tube having a curved portion at a distal first end forming a handle and an opposite second end with components for pivotable attachment to the lower section 30.

The handle may include an ergonomic grip 21 that provides a non-slip, comfortable manual grip for the user. The grip 21 may be textured and/or shaped in a variety of patterns to enhance grip and made from elastic materials, e.g. foam rubber, leather, plastic or elastomeric materials.

An adjustable strap 22 may be operatively attached to the upper section 20 so that the user may easily carry the pooper scooper 10 on his/her shoulder. The adjustable strap 22 is preferably a split band of material adjustably attached to each other via Velcro™ fasteners or other adjustable belt fasteners. However, a single band of material may be used in place thereof. The upper section 20 also includes a plurality of aligned adjustment holes 24 spaced in a line towards the opposite second end of the upper section 20. The adjustment holes 24 provide selective attachment points for one end of the strap 22 so that the user has another option for adjusting strap length to his/her comfort.

The lower section 30 may be a substantially hollow cylindrical tube having a first end with components for pivotable attachment to the second end of the upper section 20. The lower section 30 includes a waste collecting control 60 controlling operation of a pivotable waste collecting assembly 80 operatively attached to the opposite second end of the lower section 30.

Provision is made for selective folding of the pooper scooper 10 that the pooper scooper 10 may be easily stored with minimal space requirements as well as portability.

Figure 6:
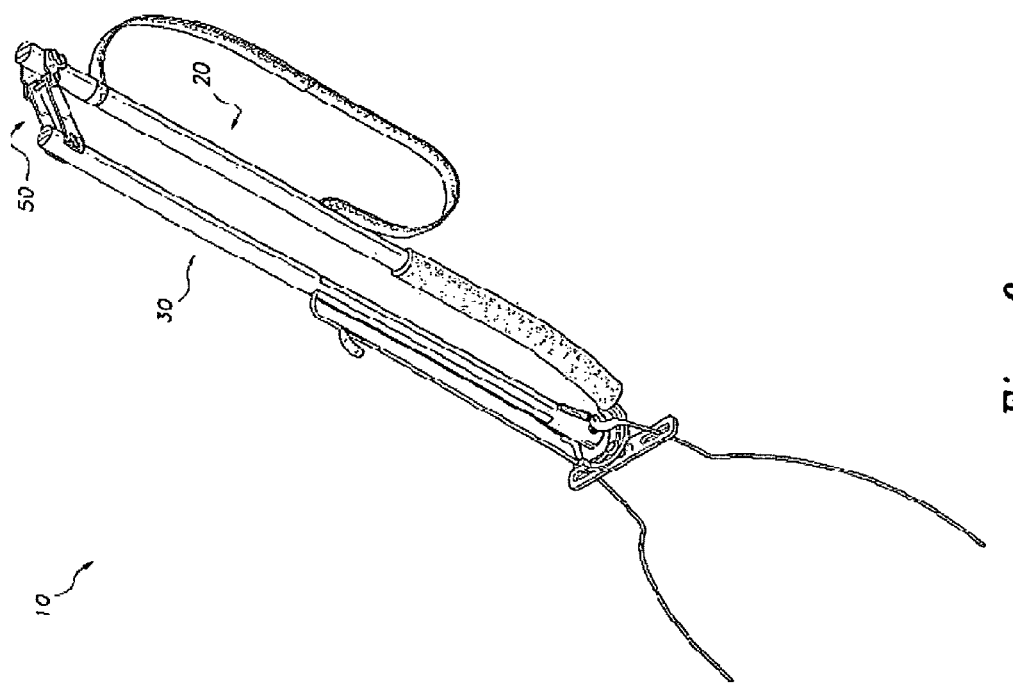
FIG. 6 is a side view of the pooper scooper according to the present invention in a folded position.
Figure 7:
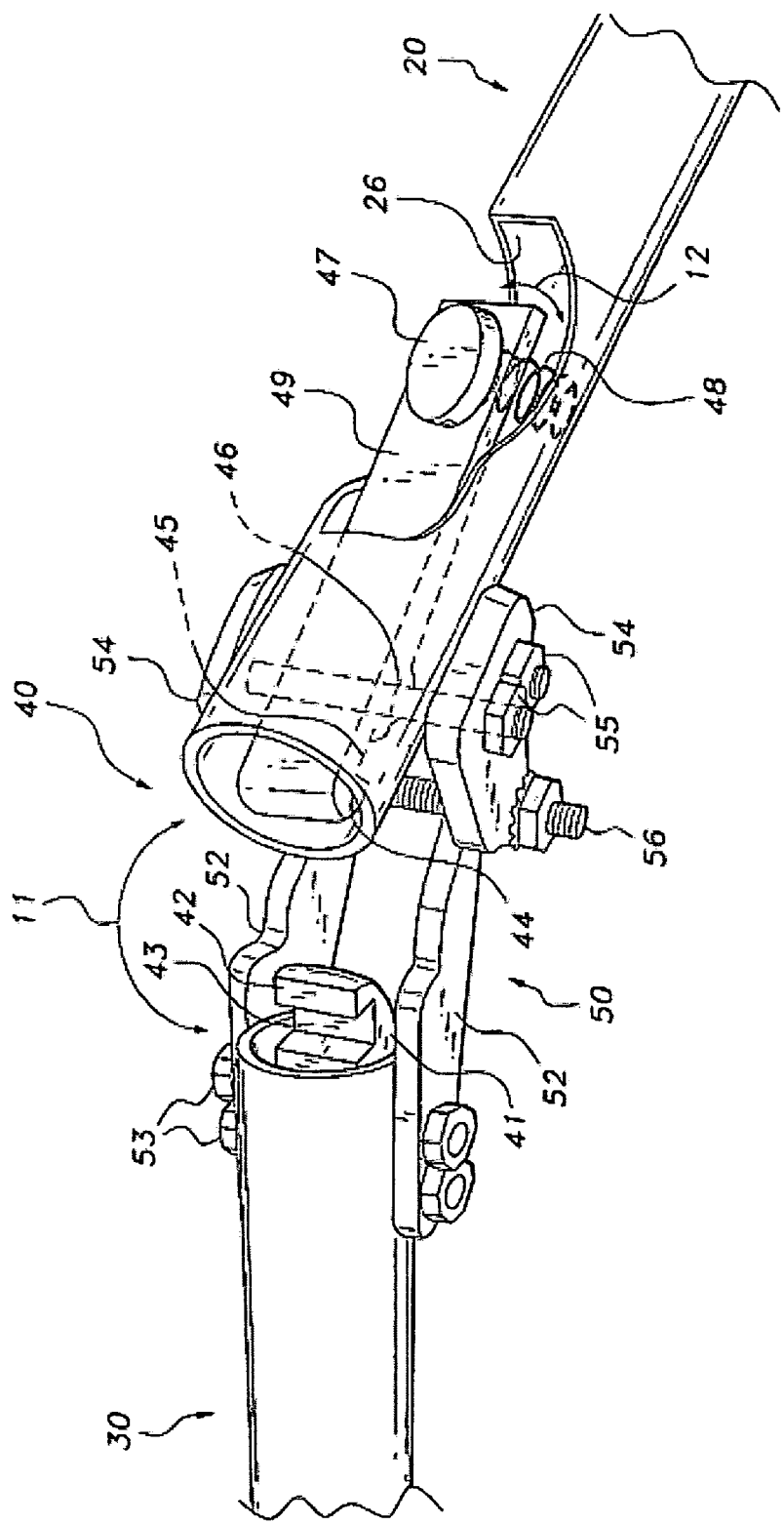
FIG. 7 is an enlarged perspective of joint and the biased locking mechanism of the pooper scooper according to the present invention.

Referring to FIGS. 6 and 7, the pooper scooper 10 includes a releasable locking mechanism 40 cooperating with a joint or hinge mechanism 50 to lock the two sections of the pole into the 10 extended operative position for collecting wastes or fold into the portable or stored position as shown in FIG. 6.

One part of the releasable locking mechanism 40 includes a protruding hook 42 disposed within the hollow of the lower section 30. The hook 42 extends from the first end of the lower section 30 and includes a hook body 41 fixedly attached inside the hollow 15 and a trough 43 forming the hook 42.

It should be noted that the hook 41 is facing in one direction. The other part of the releasable locking mechanism 40 includes a pivotally mounted hook 44 disposed inside the hollow of the upper section 20 at the second end thereof. The pivotable hook 44 includes an elongate body 49 having a trough 45 at one end forming the hook 44, a pivot 46 formed at the bottom and a releasing button 47 at the opposite end with a tension spring 48 attached between the button 47 and the interior wall of the upper section 20.

A groove 26 is formed near the second end of the upper section 20 to define a housing for and access to the knob 47. It should be noted that the pivotable hook 44 is facing a direction opposite from the hook 42 and is normally biased in a down position due to the spring 48.

Thus, to lock the pooper scooper 10 into the extended position, the user unfolds the upper and lower sections 20, 30 as indicated by arrows 11 until the hooks 42, 44 latch together in a mating relationship facilitated by the respective troughs 43, 45. To release the locking engagement, the user simply presses the releasing 15 button 47, as indicated by arrows 12, overcoming the force of the spring 48 and thereby disengaging hook 45 from hook 42. To control the folding motion of the pooper scooper 10 and ensure proper alignment of the two sections, each section is provided with brackets forming the joint or hinge mechanism 50. The first end of the lower section 30 includes a pair of lower section brackets 52 mounted on either side of the lower section 30 via fasteners 53. Each of the lower section brackets 52 includes an extended portion that end in a pivot hole. The second end of the upper section 20 also includes a pair of upper section brackets 54 mounted on either side of the upper section 20 via fasteners 55. One of the fasteners 55 serves as a pivot pin for the pivotable hook 44. Each of the upper section brackets 54 also includes an extended portion that end in a pivot hole. A pivot pin fastener 56 interconnects the pivot holes of both upper and lower section brackets 52, 54 and function as a pivot pin therebetween. The rigid connection of the brackets 52, 54 on their respective sections 30, 20 as well as the shape of the brackets ensures that the sections 20, 30 are controlled 15 and properly aligned whenever the sections pivot about the pivot pin 56. Thus, it can be seen that selective folding of the pooper scooper 10 facilitated in a controlled manner through the interaction between the locking mechanism 40 and the hinge mechanism 50.

For collecting pet wastes, the pooper scooper 10 includes a pivotable waste collecting assembly 80 selectively actuated by a waste collecting control. The actual collecting of the wastes occurs via a bag 100, 200 configured to work in conjunction with the waste collecting assembly 80, the details of which will be further discussed below.

Referring to FIGS. 2-5B, the waste collecting control 60 includes a substantially elongated control arm or rod 62 slidably mounted on the lower section 30. The proximal end of the control rod 62, i.e. the end normally operated by a user, includes a portion projecting interior of the hollow of the lower section 30 through one of three rail slots 36 defined thereon. The three slots 36 are preferably of equal length and equidistantly spaced around the lower section 30, i.e. spaced at 900 intervals, and the projecting portion of the control rod 62 is preferably disposed within the middle slot 36 of the three.

A slider pin 63 may be attached to the projecting portion of the control rod 62 in a transverse orientation so that the opposite ends of the slider pin 63 extend outside the two remaining slots 36 and secured thereto by fasteners. In this manner, the reciprocating motion and path of the control rod 63 is controlled by the slider pin 63 and the rail slots 36, the slider pin 63 maintaining proper orientation of the control arm 62 as it rides in the rail slots 36. The control arm 62 may be actuated by an outwardly projecting control button 61 sized and shaped for the fingers of a user and manipulated thereby.

A tension spring 64 disposed inside the lower section 30 connects the end of the projecting portion of the control rod 62 to the interior of the lower section 30 to bias the control rod 62 back to the normal rest position as shown in FIGS. 2 and 3 the opposite end of the control arm 62 includes a curved or actuate tongue or bracket 65 having an enclosed slot 67 extending in an arc of about 90°. The enclosed or control slot 67 serves as a guide for a waste collecting prong control bracket 70 attached to the control slot 67 by a slidable fastener 71. The control slot 67 limits movement of the prong control bracket 70 within a 90° arc, which correspondingly limits the range of pivotable movement of waste collecting prongs 81. The control bracket 70 may be an oblong plate slidingly mounted to the bracket 65 and perpendicular thereto.

The control bracket 70 includes a pair of oblong shaped prong control slots 72. The prong control slots 72 are adapted to slidingly receive the aforementioned waste collecting prongs 81 and manipulate them as the control rod 62 reciprocates, the details of which will be further discussed below. To ensure the control bracket 70 will return to its normal position, the pooper scooper 10 includes a biasing mechanism 10 or tension spring 73 connected to the control bracket 70 and a spring mounting pin 73 disposed in a partial slot 68 on the terminal end of the curved bracket 65, the partial slot 68 being aligned with the control slot 67. Thus, as shown in FIG. 3 and indicated by arrows 13, the control bracket 70 may move between the positions shown in phantom and solid lines limited by the control slot 67 and the slidable fastener 71, the solid line representing the normal position of the control bracket 70.

Figure 4:
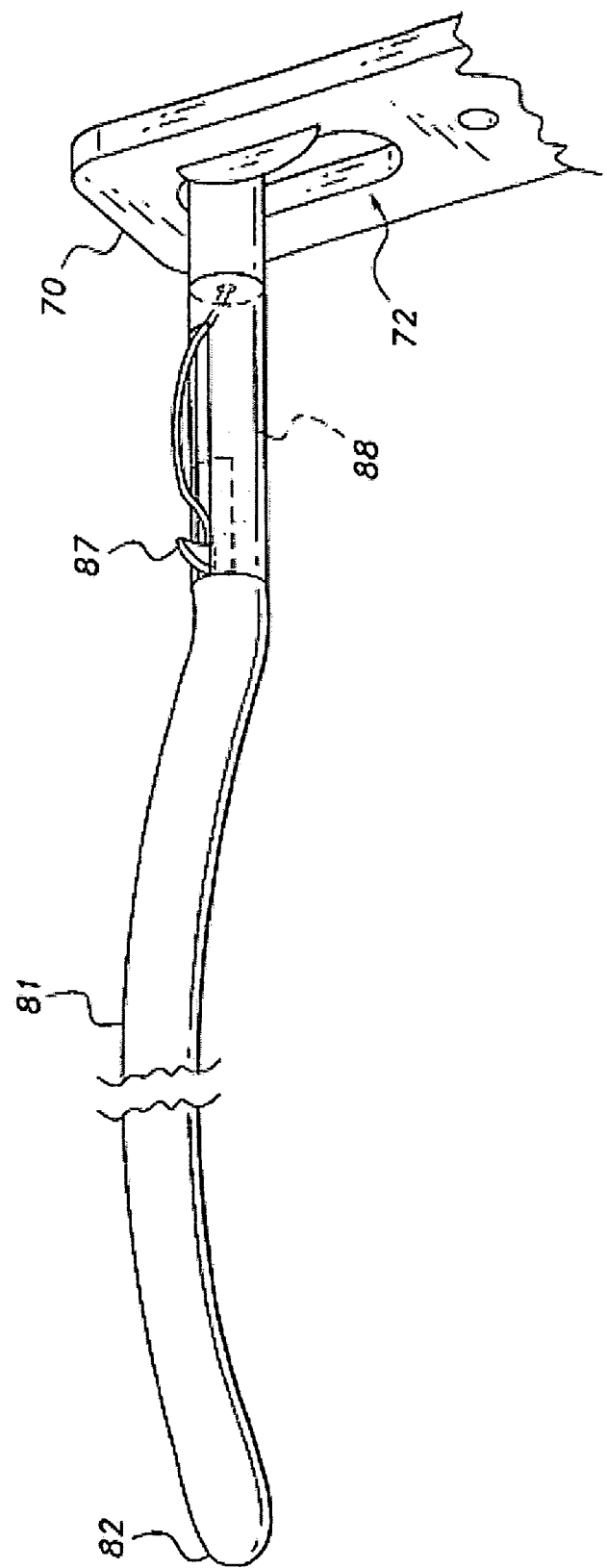
FIG. 4 is an enlarged perspective view of one of the prongs in the pooper scooper according to the present invention.
Figure 5A:
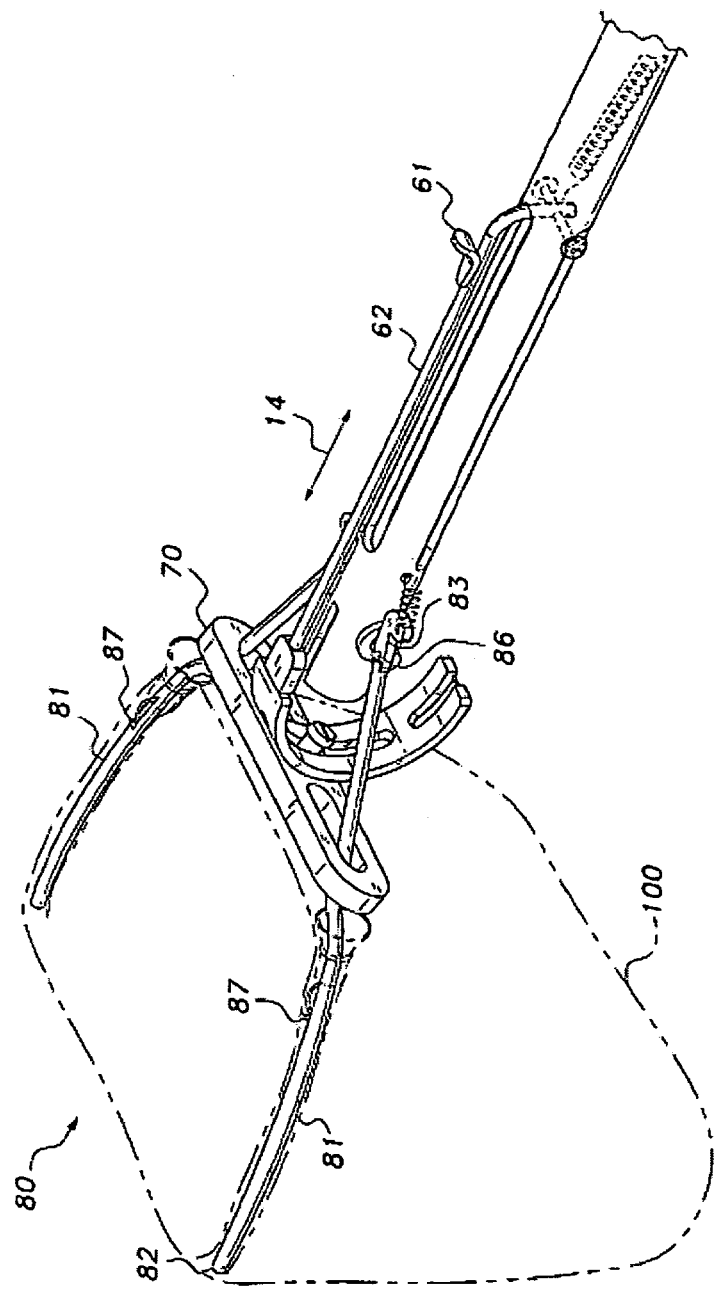
FIG. 5A is a perspective view of the pooper scooper according to the present invention showing operation of the prongs in a normal open position.

Referring to FIGS. 4-5B, the waste collecting assembly 80 includes a pair of pivotably mounted waste collecting prongs 81. Each waste collecting prong 81 may be a curved or arcuate elongated tube having a terminal or bag insertion end 82 and a pivot attachment end 83. The prongs 81 are shaped and disposed so as to be mirror image of each other and form a jaw-like structure. See, e.g. FIGS. 5A and 6. The pivot attachment end 83 may be pivotably attached via pins 86 to the prong pivot mounts 84 formed on the distal ends of a pivot roller 85 rotatably mounted inside the second end of the lower section 20. The pivot roller or pin 85 permits one of two degrees of pivoting motion for the prongs 81 mounted on respective sides thereof.

As can be seen in FIG. 3, the first degree of pivoting motion would be about the longitudinal axis of the pivot roller 85. In addition, the pivot roller pin 85 includes an arc limit pin 89 extending perpendicular to the longitude of the roller pin 85. In conjunction with the slot 90, the arc limit pin 87 ensures that the prongs 81 will not rotate about pivot roller 85 more than about 900. The second degree of movement for the prongs 81 is about the axis of the pivot pin 86. The pivot attachment end 83 of each of the prongs 81 also includes a connection point for a tension spring 86 which normally bias the prongs 81 into a spread or open position.

Thus, when the user actuates the control rod 62 via the control button 61 in the direction indicated by arrow 14, the control rod 62 pushes the prong control bracket 70 towards the terminal end 82 of the prongs 81. Note the normal positions of the control rod 62 and the prongs 81 in FIG. 5A wherein the prongs are in a spread or open position. The fixed dimensions of the prong control bracket 70 and the prong control slots 72 therein forces the prongs 81 to pivot about the respective axes of the pivot pins 86 as the 10 control bracket 70 travels over the curved portions of the prongs 81 towards the terminal end 82 resulting in the closed position of the prongs 81 as shown in FIG. 5B. Releasing control button 61 permits the spring 67 to pull the control 62 and thereby reverse the operative movement of the prongs 81. As noted above, the prongs 81 are capable of more than one degree of pivotable movement. Pivoting motion about the pivot pin axes relate to operative movements of the prongs 81 for collecting wastes as shown in FIGS. 5A-5B. Pivoting motion about the axis of the pivot roller 85 permits positioning of the prongs 81 in preparation for collecting wastes as exemplified by the depiction in FIG. 1. Both degrees of motion may occur singly or in combination, but at all times, the prongs 81 may be actuated due to their operative connection to the prong control bracket 70.

Figure 8:
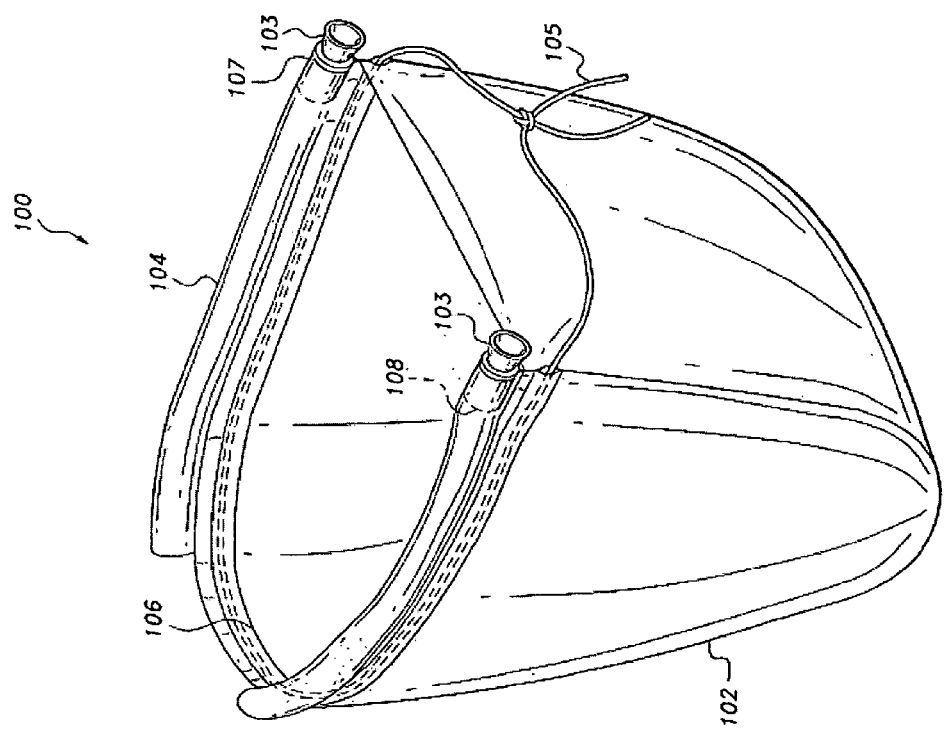
FIG. 8 is a perspective view of a waste collecting bag for the pooper scooper according to the present invention.
Figure 9A:
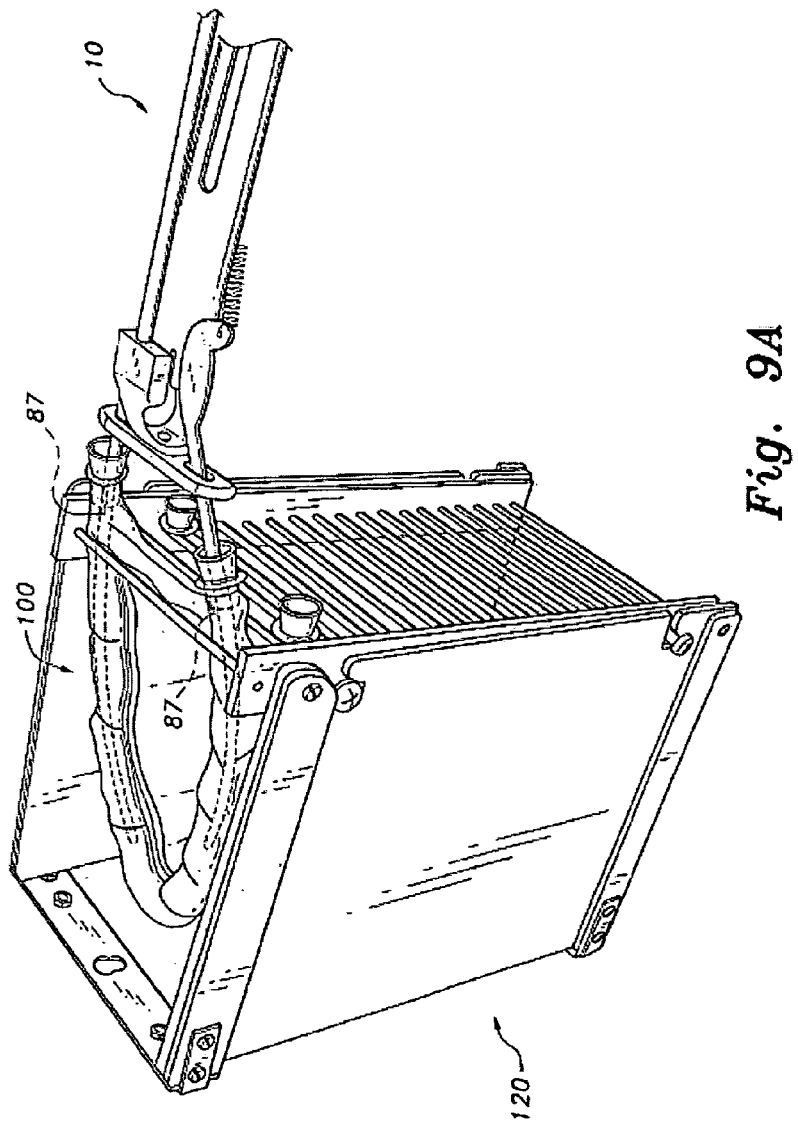
FIG. 9A is an environmental perspective view of a bag rack system for the pooper scooper according to the present invention.
Figure 9B:
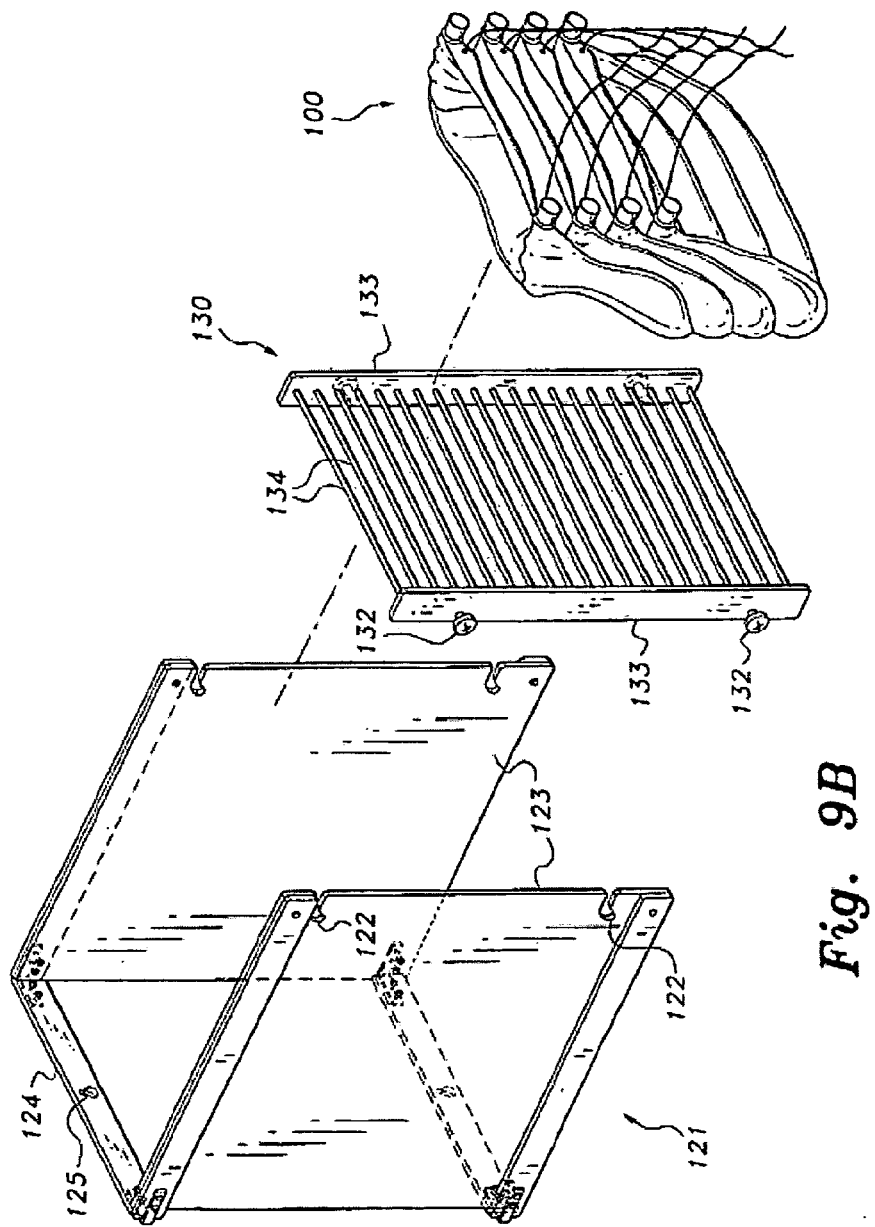
FIG. 9B is an exploded view of the bag rack system shown in FIG. 9A for the pooper scooper according to the present invention.
Figure 10:
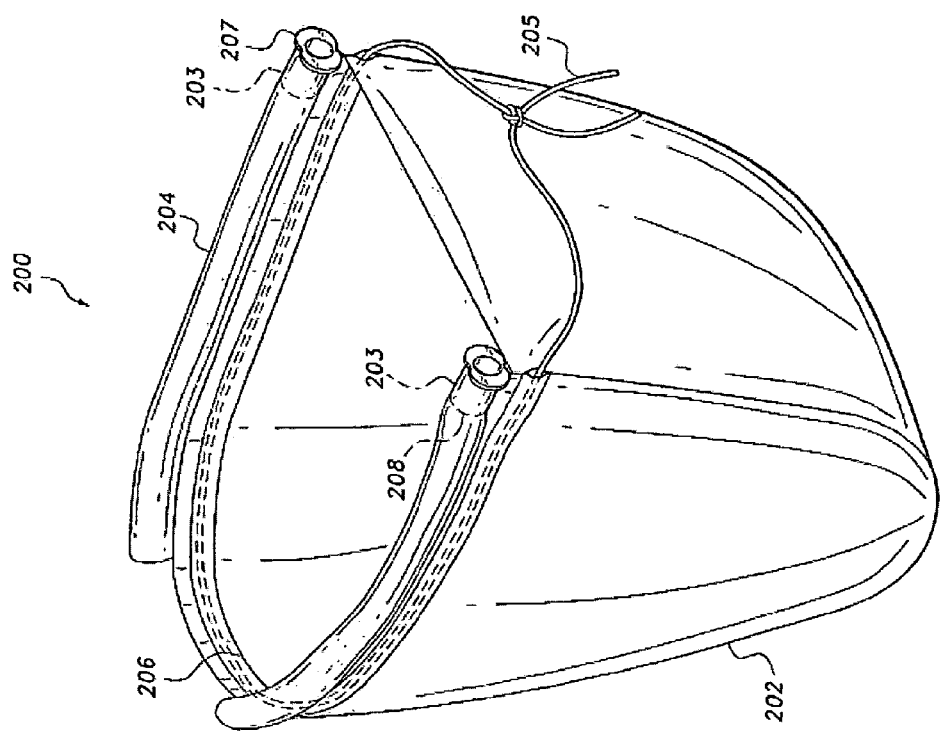
FIG. 10 is a perspective view of an alternative waste collecting bag for the pooper scooper according to the present invention.
Figure 11:
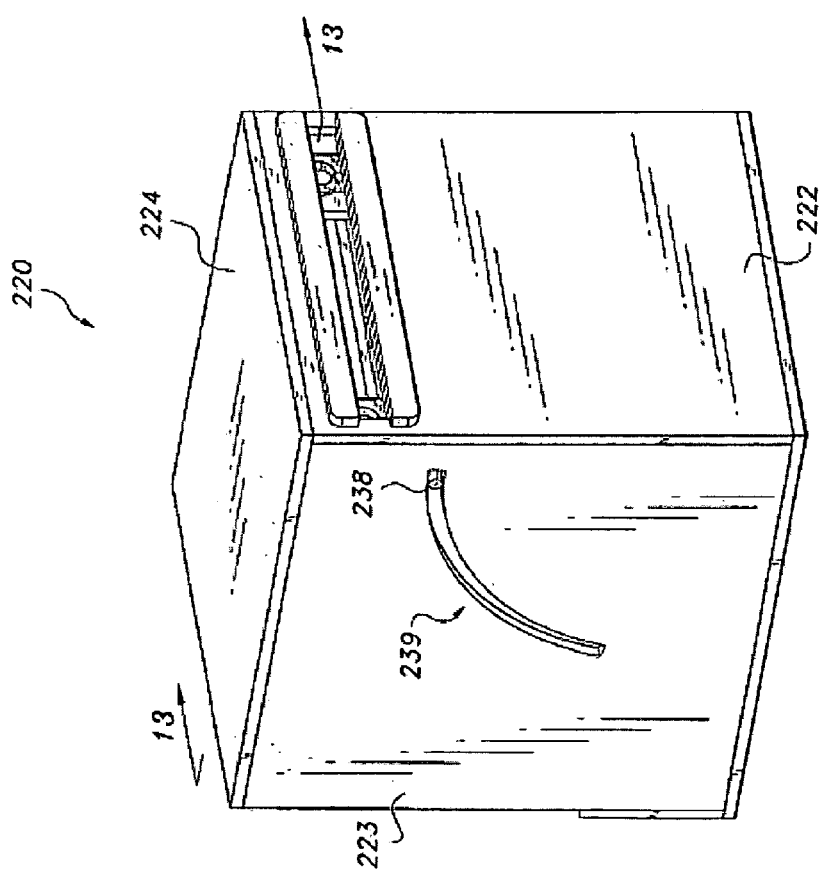
FIG. 11 is a perspective view of an alternative bag dispensing system for the pooper scooper according to the present invention.

The following describes two possible bags and dispensers therefore. These are to be used in conjunction with the pooper scooper 10 described above and a detailed description of how to use the pet waste disposal system will follow. As noted above, the pooper scooper 10 is part of a pet waste disposal system, which includes a bag and a bag dispenser. With reference to FIG. 8, the waste collecting bag 100 includes a body 102 having an open end at the top portion thereof. A pair of prong channels 104 is formed at the top of the bag 100 with the same end of each of the prong channels 104 fixedly receiving a frustoconical shaped prong insert 103. Each insert 103 is adapted to receive one of the prongs 81 and permit passage of the prong 81 into the respective prong channel 104 to spread the bag 100 open. Another channel 106 may be formed below prong channels 104 and extend majority of the circumference of the bag 100. The channel 106 is adapted to receive a drawstring 105. The bag 100 may be dispensed from a bag dispenser 120 as shown in FIGS. 9A-9B. The bag dispenser 120 includes a bag housing frame 121 having spaced sidewalls 123 connected together by cross beams 124 disposed near the top and bottom of the frame, thereby stabilizing the overall structure. Each cross beam 124 may include a mounting hole 125 to mount the bag dispenser 120 to a wall. Each sidewall 123 includes a pair of bag rack mounting cutouts 122 disposed on one end of the sidewall 123. These cutouts 122 are preferably hook shaped and oriented in a downward direction for secure mounting of a bag dispensing rack 130. The bag dispensing rack 130 includes a pair of elongated rack walls 133 with a plurality of rack rods 134 disposed between the rack walls 133. The rack rods 134 are equidistantly spaced along the length of the rack walls 133, the spacing providing room for insertion of a bag 100 between the rods 134.

The bag dispensing rack 130 is sized to fit between the sidewalls 123. To securely mount the rack 130 to the housing 121, a matching pair of installation pins 132 may be formed on the exterior portion of each of the rack walls 133. The installation pins 132 are adapted to mount in the cutouts 122 as shown in FIG. 9A, and the pins preferably include an enlarged head for secure engagement therewith. When assembled (FIG. 9A), the prong inserts 103 extend outwardly of the rack 130 in preparation for use with the pooper scooper 10.

The following describes how the pooper scooper 10 and the waste collecting bag 100 are used to dispose of pet wastes. Referring to FIGS. 1, 4 and 9A, to prepare for a pet's latrine use, the user inserts the terminal ends 82 of the prongs 81 into corresponding prong inserts 103 on one of the bags 100. Each of the inserts 103 may include an elastic annular gasket 107 to provide more friction engagement with the prong 81. To further ensure proper engagement between the prongs 81 and the bag 100, each prong 81 includes a biased bag hook 87 near the proximal end of the prong 81. The spring 88 provides enough force to ensure the bag hook 87 frictionally engages the interior of the prong insert 103, and when fully inserted, the bag hook 87 engages the rear ledge 108 of the respective prong insert 103. Once inserted, the user pulls the pooper scooper 10 out of the dispenser 120 with the bag 100 attached to the prongs 81. The user then hooks the loose part of drawstring 105 over a drawstring hook 69 disposed at the second end of the lower section 30 (FIG. 3) and is now ready for use.

At this point, the biased prongs 81 maintain the bag 100 in an open condition. When the pet is prepared to defecate, the user places the bag 100 at an appropriate spot to catch the pet's waste with the assistance of the two degrees of movement of the waste collecting assembly 80 in positioning the bag 100. When the pet is finished, the user actuates the waste collecting control 60 via button 61 to thereby slide the control bracket 70 over the prongs 81 towards the terminal end 82. As a consequence, the control bracket 70 engages the humped spring of the bag hook 87 to lower and thereby release engagement of the bag hook 87 with the rear ledge of the respective prong insert 103 allowing the control bracket to scrape the prong inserts 103 off the prongs 81. This action automatically closes the bag 100, include the drawstring 105 is hooked to the drawstring hook 69. Compare FIGS. 5A and 5B. The user then unhooks the drawstring, and the bag 100 is ready for prompt disposal. Thus, it can be seen that the pooper scooper 10 requires minimal handling to dispose of pet wastes and is more sanitary as a consequence.

Alternative Pooper Scooper Bag and Dispenser:

Referring to FIGS. 10-14, these figures disclose an alternative bag and dispenser. The alternative waste collecting bag 200 includes a body 202 having an open end at the top portion thereof. A pair of prong channels 204 is formed at the top of the bag 200 with the same end of each of the prong channels 204 fixedly receiving a prong insert 203. Each insert 203 is adapted to receive one of the prongs 81 and permit passage of the prong 81 into the respective prong channel 204 to spread the bag 200 open. Each insert 203 also includes a rear ledge 208 to which the hooks 87 may latch. The head portion of each of the inserts 203 includes an oblong shaped flange 207, the purpose of which will be explained further below.

Another channel 206 may be formed below prong channels 204 and extend majority of the circumference of the bag 200. The channel 206 is adapted to receive a drawstring 205. The bag 200 may be dispensed from an alternative bag dispenser 220 as shown in FIGS. 11-14. The bag dispenser 220 is a box shaped housing having a base 221, a front wall 222, sidewalls 223, a back brace 225, a removable cover 224 at the top, and a biased bag dispensing sub-frame 230 pivotably disposed inside the housing by, e.g., a hinge 231.

The sub-frame 230 may be a square or rectangular frame having a elongate base 233 connected to the hinge 231 and bag dispensing rails 232 disposed at the ends of the base 233 and extending upwardly therefrom. Each of the rails 232 is slotted to accommodate insertion of respective prong inserts 203 of a plurality of bags 200. A guide post 234 is centrally disposed on the base 233 and includes a coil spring 235 mounted thereon.

A bag pusher bar 236 is operatively attached to the guide post 234 and spring 235 and reciprocates along the guide post 234. The bag pusher bar 236 facilitates loading of bags 200 into the dispenser 220 and positioning the bag 200 for use with the pooper scooper 10. To ensure stable angular movement and/or positioning of the sub-frame 230, each rail 232 includes outwardly projecting guide pins 238 adapted to ride in arcuate guide slots 239 on each of the sidewalls 223. The guide pins 238 and the guide slots 239 limit the pivotable range of movement of the sub-frame 230 to within about a 90° arc.

Figure 12:
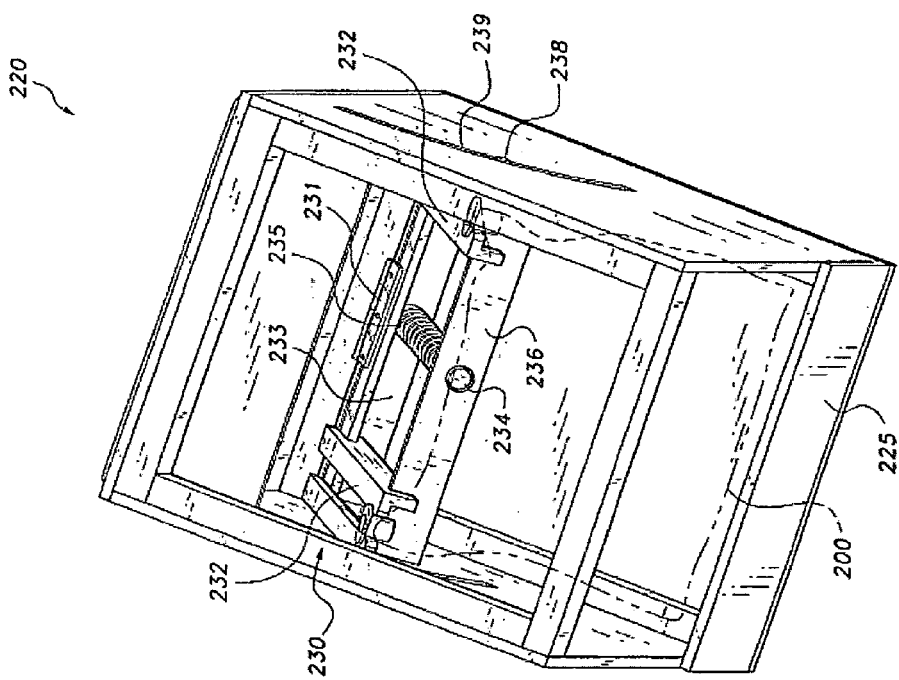
FIG. 12 is a top view of the alternative bag dispensing system for the pooper scooper according to the present invention.
Figure 13:
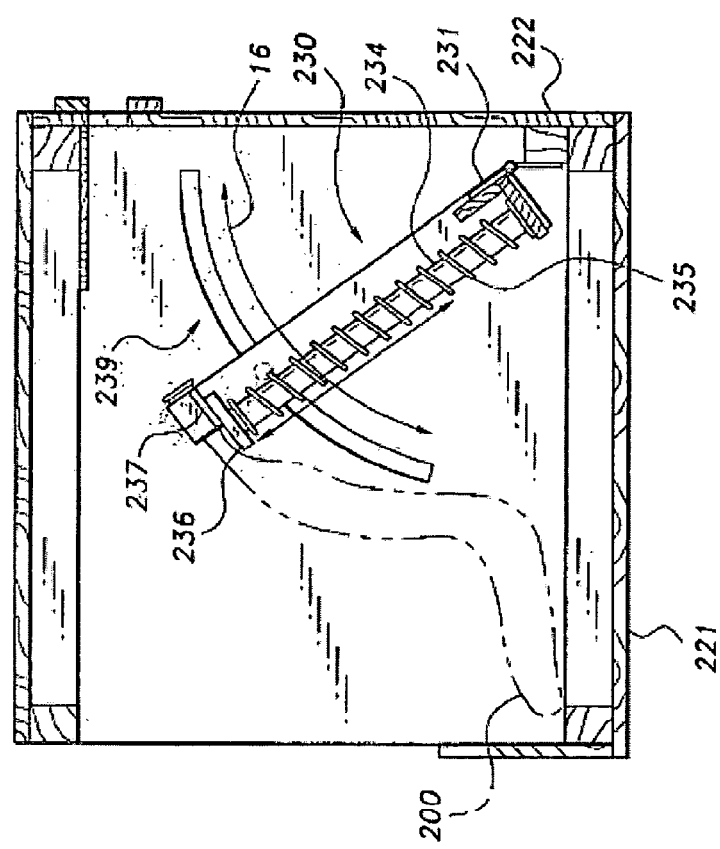
FIG. 13 is a sectional view of the alternative bag dispensing system for the pooper scooper according to the present invention.
Figure 14:
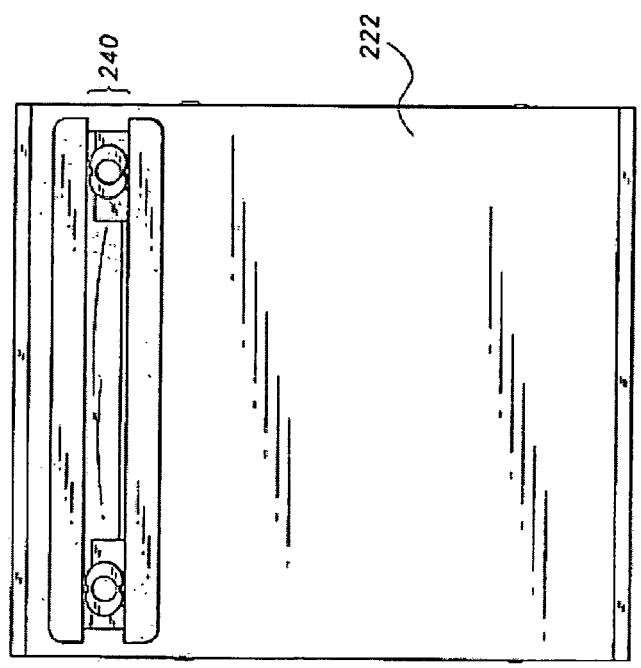
FIG. 14 is a front view of the alternative bag dispensing system for the pooper scooper according to the present invention.
Figure 15:
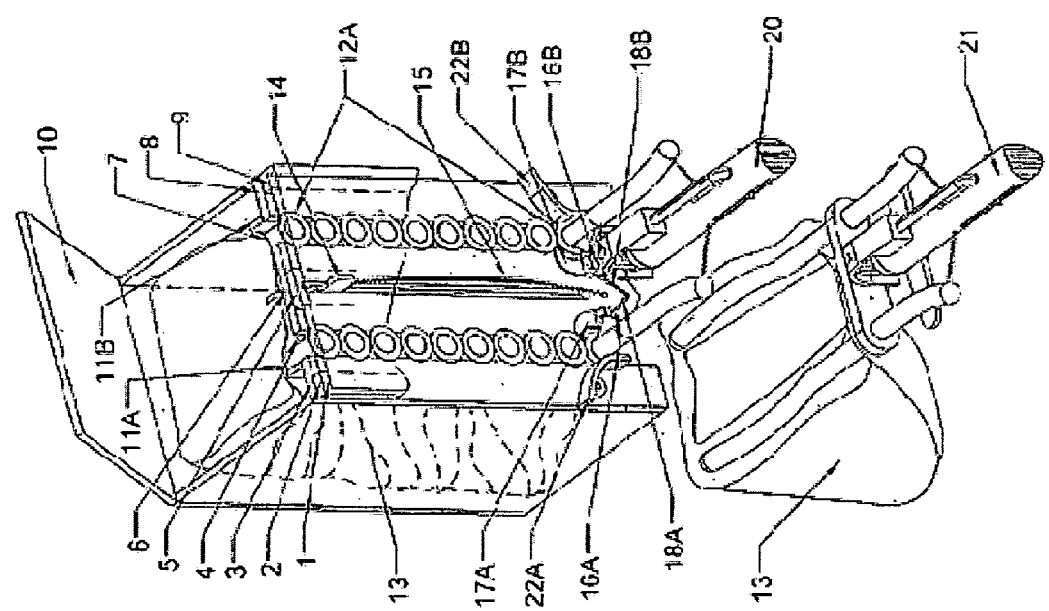
FIG. 15 is a perspective view of a rectangular shape box according to an alternative bag dispensing system having an opening at the top and bottom of the box.
Figure 16:
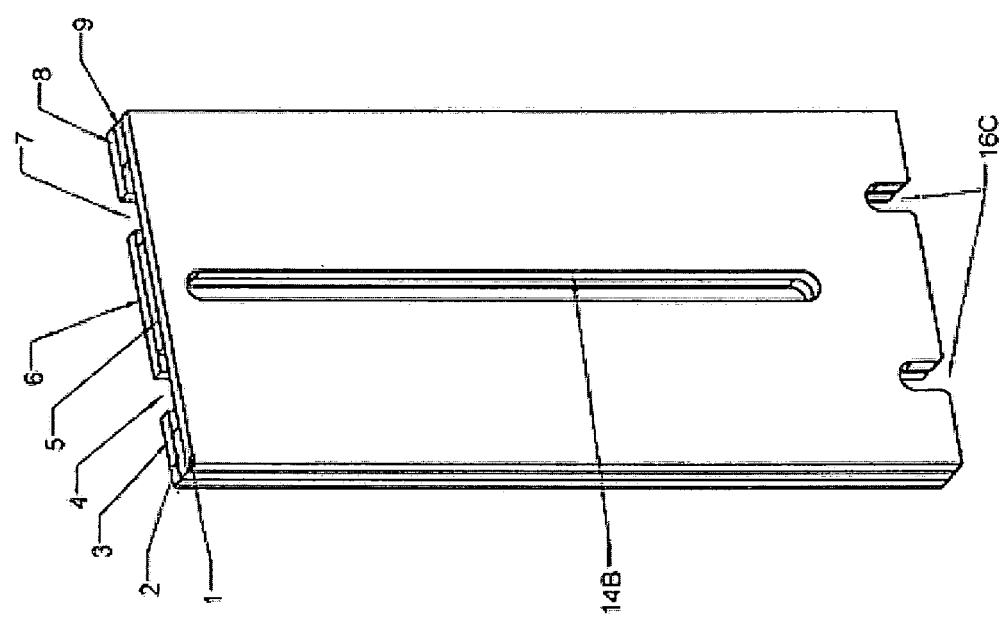
FIG. 16 is a perspective view of a front panel of the alternative bag dispensing system of FIG. 15.
Figure 17:
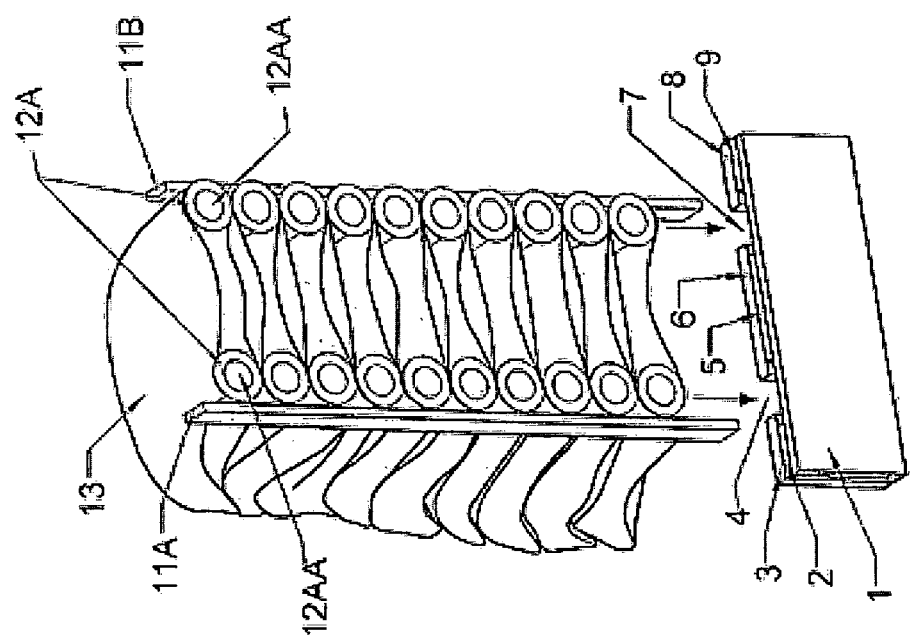
FIG. 17 is a perspective view which illustrates the waste bag loading strips.
Figure 18:
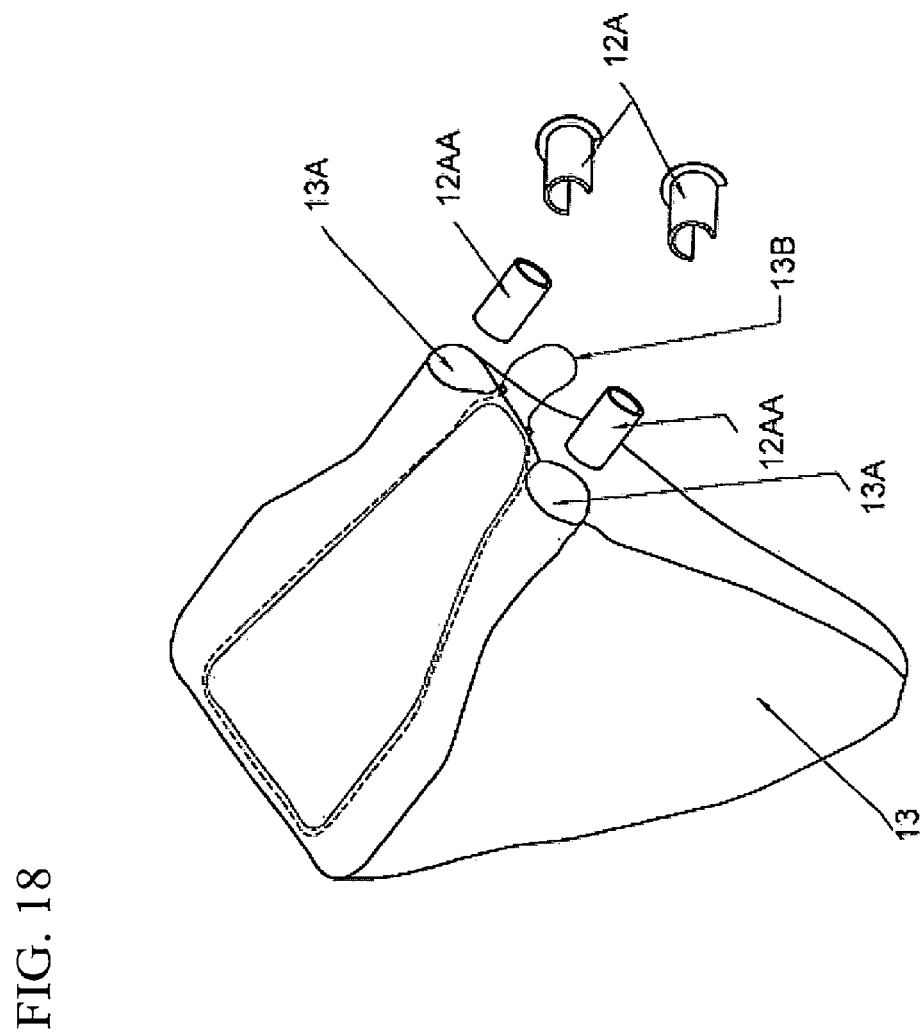
FIG. 18 is a perspective view which illustrates the waste bag draw strings. 13b is the dog waste bag draw string. 13b works in coordination with the dog waste catching unit closing the bag of waste. 12a is a saddle/lip FIG. 18 after 12aa has been glued into area 13a of the dog waste bag; 12a is the glued on top to create the lip needed to hold the bags in slotted area 4 and 7 of the unit. 13b shows that the draw strings goes around the complete perimeter of the dog waste bag 13.
Figure 19:
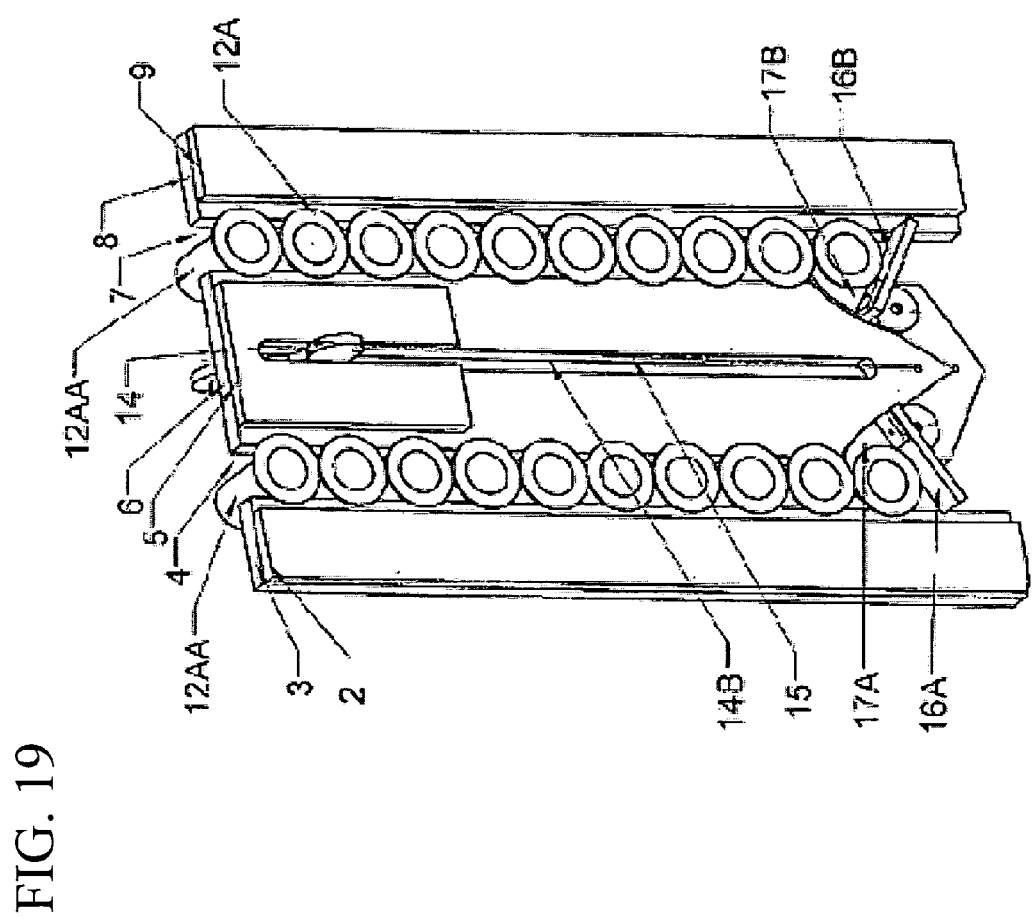
FIG. 19 is a perspective view which illustrates the left and right waste extraction lever.
Figure 20:
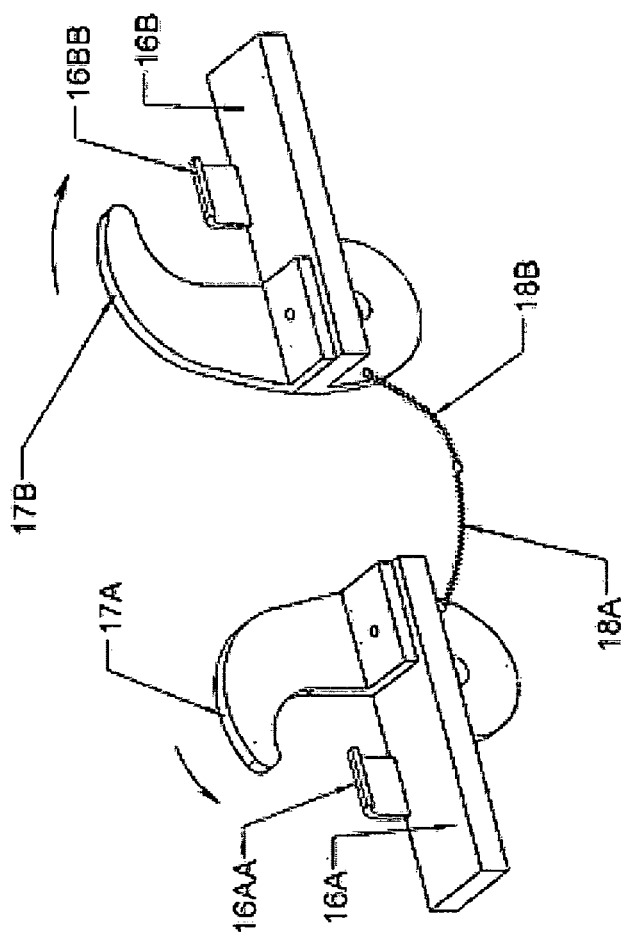
FIG. 20 is a perspective view which illustrates an detail view of the left and right waste extraction lever.
Figure 21:
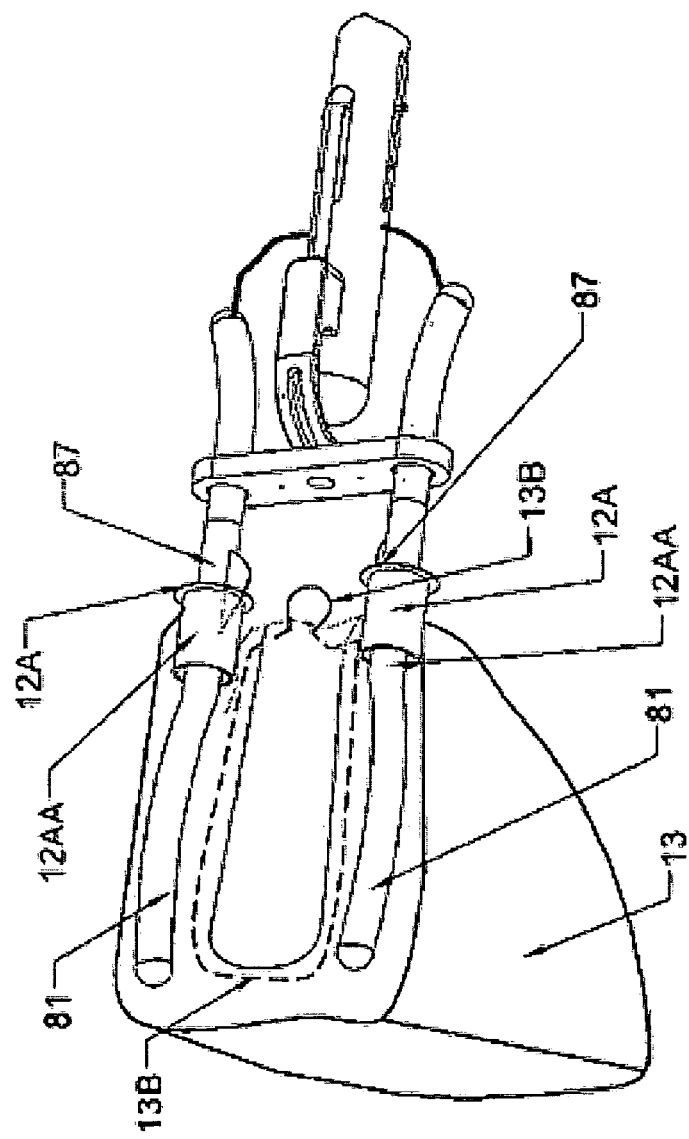
FIG. 21 is a perspective view which illustrates an alternative embodiment to the loaded bag hook according to the present invention.
Figure 22:
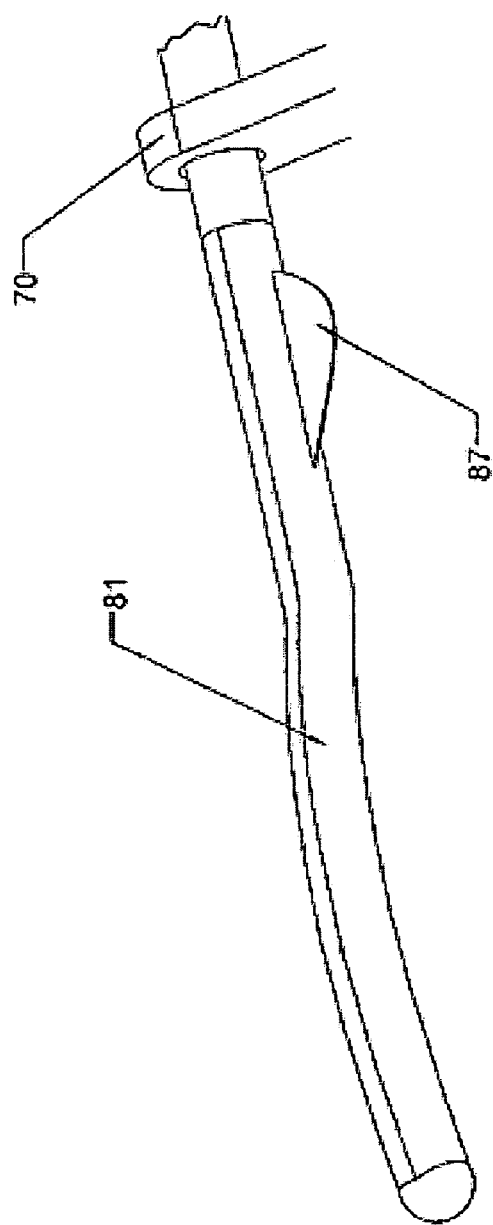
FIG. 22 is a perspective view which illustrates a detail view of the loaded bag hook shown in FIG. 21.

Optionally, each of the guide pins 238 may be secured at a preselected position with suitable fasteners. With the cover 224 removed; the pivotable sub-frame 230 allows user access to the bag pusher bar 236 as illustrated in FIG. 12. To load the dispenser with bags 200, the sub-frame 230 is allowed to pivot down to an extent for easy manipulation by the user. The user pushes the bar 236 down to provide room for insertion of the prong inserts 203 in the respective rails 232. This process is repeated until the desired amount of bags 200 have been loaded. The sub-frame 230 is then pivoted to the upright position and secured. It is noted that oblong flange 207 on each of the prong inserts 203 have flat sides. These flat sides permit stacking of the bags 200 in the sub frame 230 with each set of bag flanges 207 stacked on top of each other. Moreover, the lateral projecting portions of the flange 207 ensure that each prong insert 203 rides securely on the respective rails 232. It is further noted that the sub-frame 230 includes stops 237 to prevent the bag pusher bar 236 from obstructing removable of the bag 200 when aligned with the dispensing slot 240 on the front wall 222.

To dispense each bag 200, the front wall 222 includes the dispensing slot 240 dimensioned to allow, passage of the prong inserts 203 and thus, removable of a bag 200 from within the dispenser 220. Removable of the bag 200 from the dispenser 220 is substantially the same as described above for the dispenser 120. Moreover, the operational use of the bag '200 is 10 substantially the same as set forth with respect to bag 100. It is noted that the pooper scooper may encompass a variety of alternatives to the various features thereof. For example, the pooper scooper 10 may be made from aluminum, plastic, or other lightweight sturdy materials. The bags 100, 200 may be multi-ply bags, and the drawstring 15 may be provided by stitching or other alternative methods. With respect to the selective folding feature of the pooper scooper 10, another alternative may be a configuration in which the pivot joint is not provided by separately mounted brackets. An integral offset pivot may be used in place of the previously mentioned brackets and the two sections 20, 30 need not be collinear when extended. Moreover, other types of releasable or push-button locks may be used to lock the two sections 20, 30 in the extended position.

With respect to the waste collecting control 60, another alternative configuration may include a sleeve slidably mounted to the lower section 30 and attached to the control arm 62. In this manner, the rail slots 36 would not be needed since the sleeve would be confined to slide along the lower section 30 and the direct connection of the sleeve to the control arm further ensures proper positioning and movement. The control arm 62 is not limited to the shape shown in the drawings. The shape of the control arm 62 may range from a stiff wire to an elongate flat bar as long as it is durable for the operational requirements.

With respect to the biased bag hook 87, another alternative configuration may have the spring of the hook 87 disposed opposite from that shown in, e.g., FIG. 4. An actuating wire may be threaded through the prongs 81 to a biased hook release disposed on the lower section whereby the hook may be raised or lowered. In this configuration, a humped spring may not be needed. It is to be understood that the present invention is not limited to the embodiments described above, but encompasses any and all embodiments within the scope of the following claims.

I claim:

1. A pooper scooper comprising:
an elongated foldable pole divided into upper and lower sections, the upper section having a grip at a first end;
releasable locking mechanism disposed between the upper and lower sections for locking the pole into an extended position;
a hinge mechanism interconnecting the two sections operating in conjunction with the releasable locking mechanism to control selective extension and folding of the elongated pole;
a waste collecting control having a control bracket disposed on the lower section; and
a pivotable waste collecting assembly adapted to hold a bag open to catch pet wastes or other materials and using the control bracket to push the bag to automatically close the bag by pulling a drawstring on the bag when ready for disposal through actuation of the waste collecting control.

2. The pooper scooper according to claim 1, further comprising the bag having at least a pair of insertion caps adapted to receive said waste collecting assembly.

3. A pooper scooper comprising:
a foldable pole divided into upper and lower sections, the upper section having a grip at a first end, the lower section foldable with respect to the upper section;
a releasable locking mechanism disposed between the upper and lower sections to lock the pole into an extended position;
a hinge mechanism interconnecting the two sections operating in conjunction with the releasable locking mechanism to control selective extension and folding of the elongated pole; and
a waste collecting control coupled to a control bracket disposed on the lower section; and
a pivotable waste collecting assembly adapted to pivot to hold open and to close shut a bag having a drawstring to store waste,
wherein the pivotable waste collecting assembly pivots to close the bag when the waste collecting control is actuated to have the control bracket push the bag to pull the drawstring.

* * * * *